March 15, 1938.                H. HORLACHER                2,111,288
                              MILLING MACHINE
                           Filed Nov. 22, 1935           4 Sheets-Sheet 2
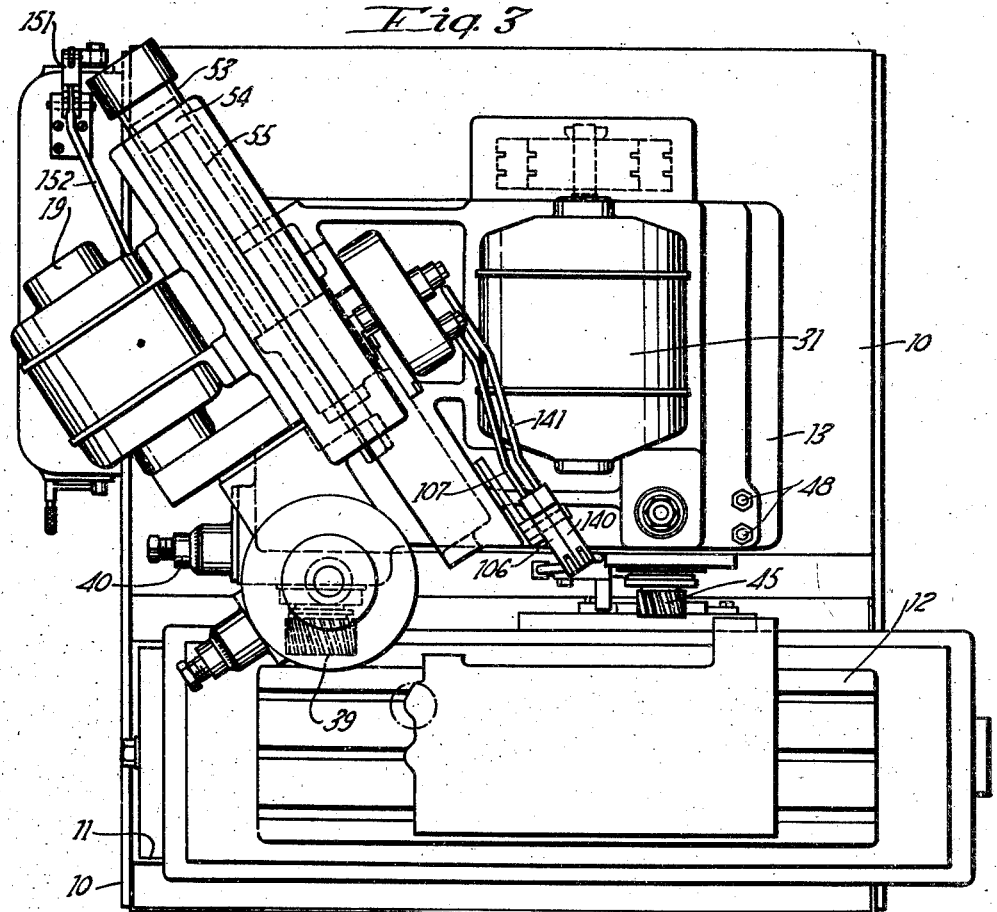
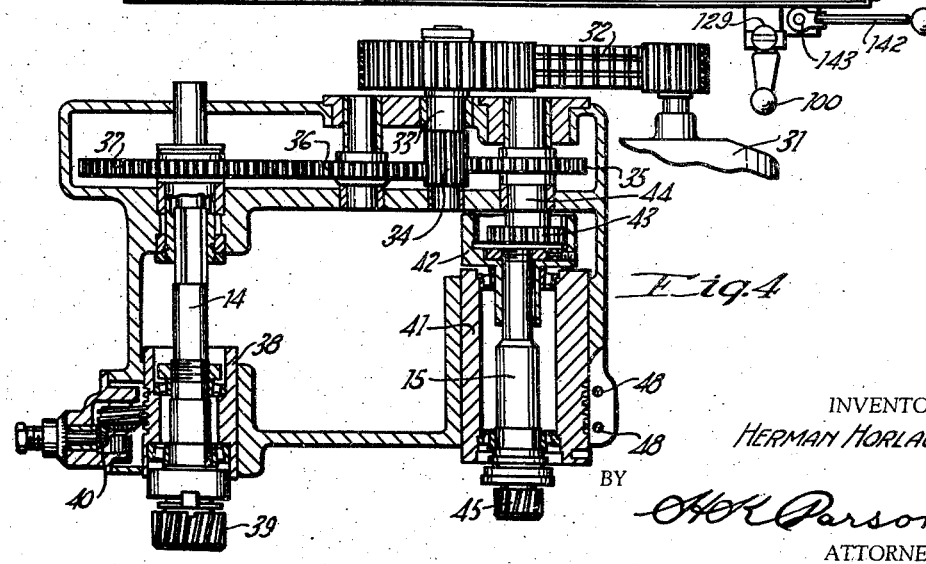
INVENTOR.
HERMAN HORLACHER
BY
A. H. K. Parsons
ATTORNEY.

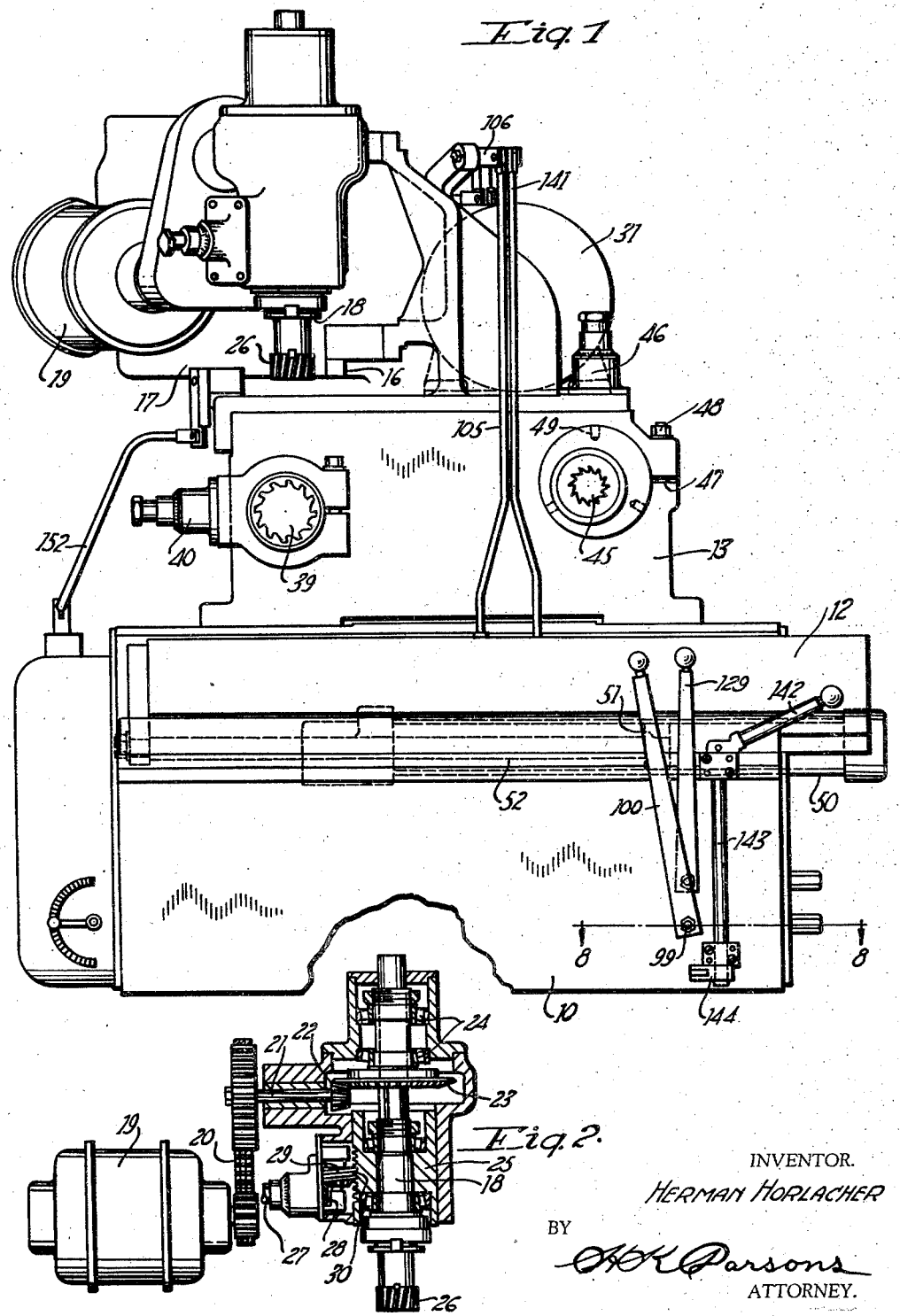

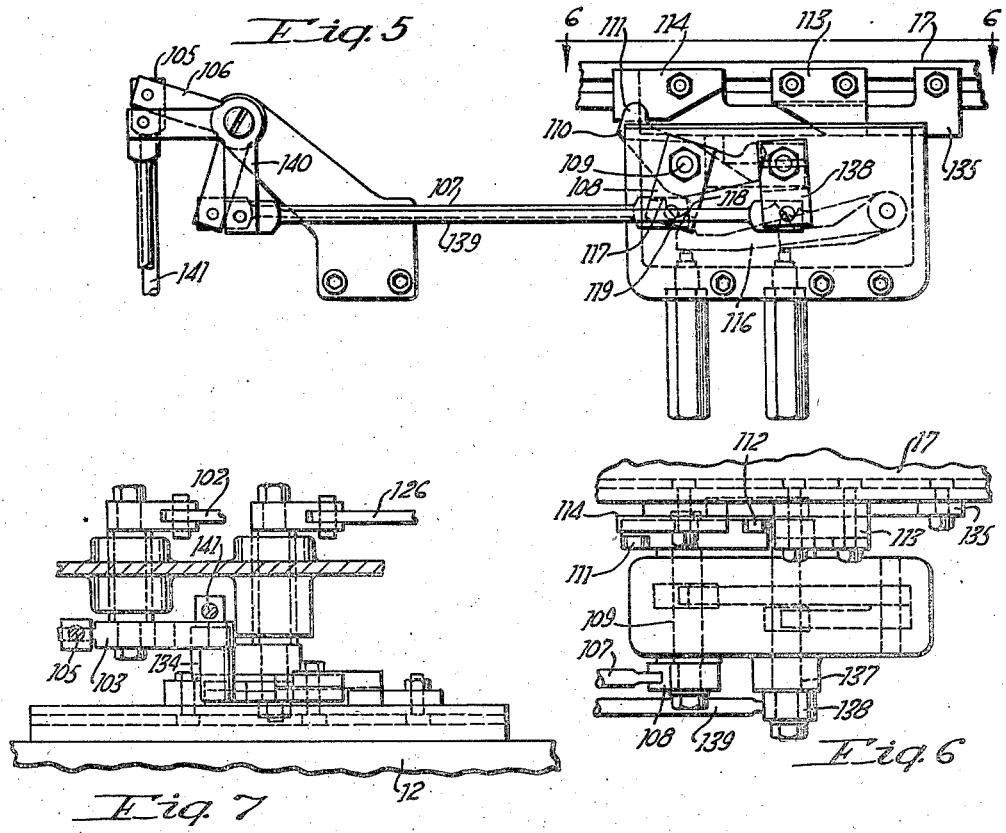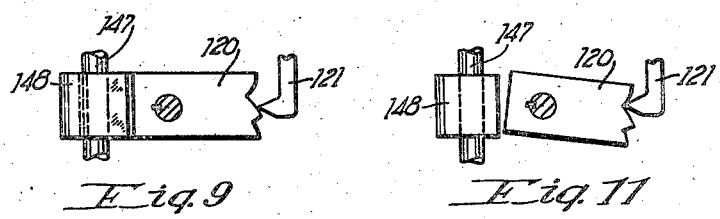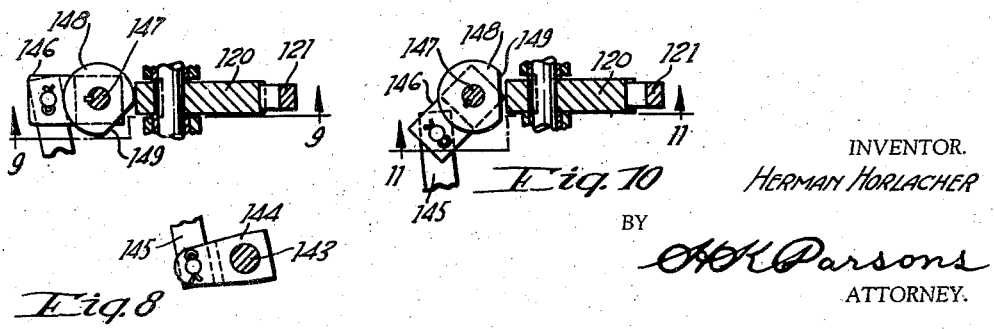

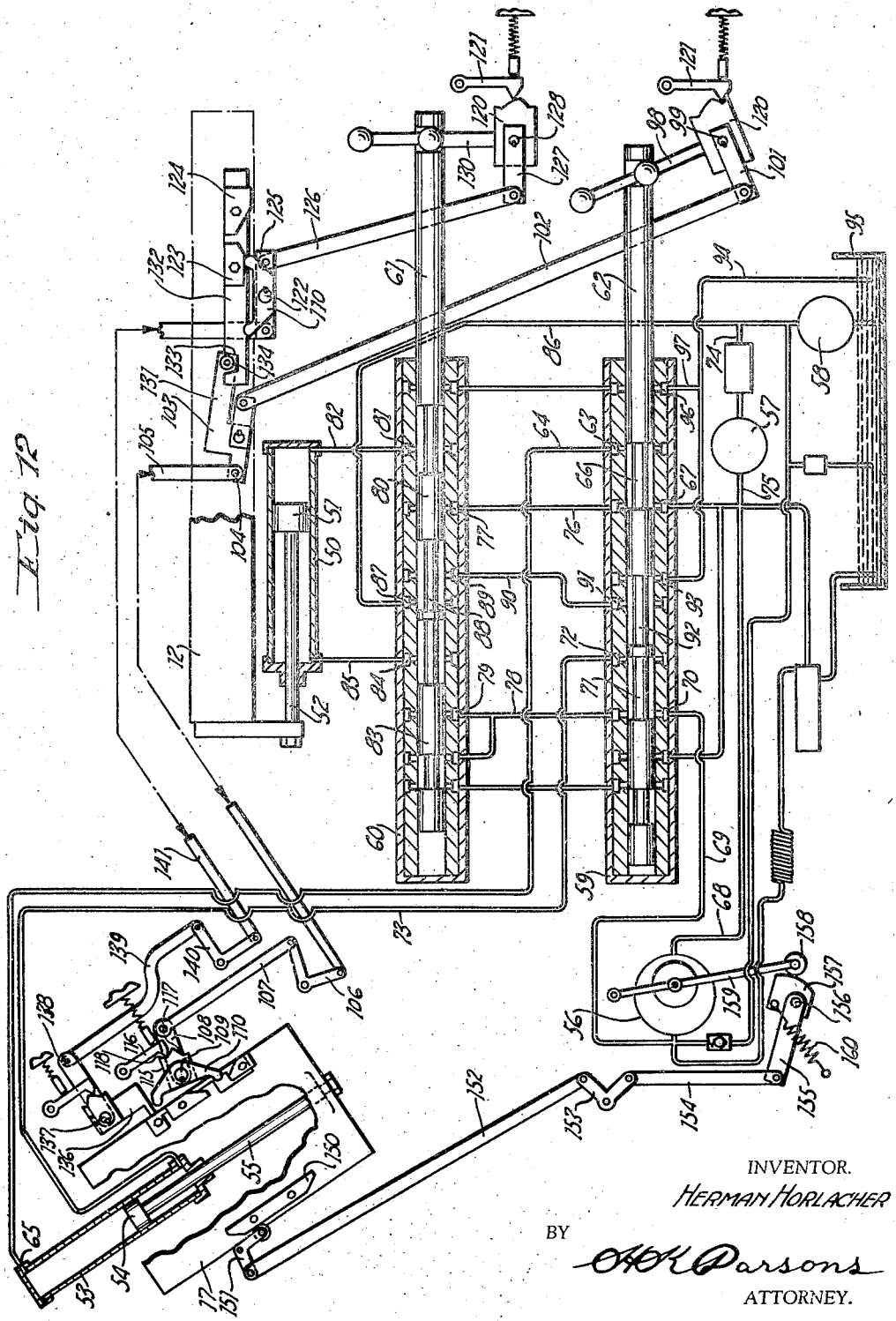

Patented Mar. 15, 1938

2,111,288

UNITED STATES PATENT OFFICE 2,111,288

MILLING MACHINE

Herman Horlacher, Cincinnati, Ohio, assignor to The Cincinnati Milling Machine Co., Cincinnati, Ohio, a corporation of Ohio Application November 22, 1935, Serial No. 51,124

7 Claims. (Cl. 90—21.5)

This invention relates to machine tools and more particularly to an improved form of milling machine.

One of the objects of this invention is to provide a machine tool in which cutting paths in angularly related planes may be obtained and without changing the setup of a work piece.

Another object of this invention is to provide a machine tool in which cutting paths may be generated in angularly related planes, and mechanism for preventing generation of more than one cutting path at a time.

A further object of this invention is to provide a machine tool for generating cutting paths lying in different planes.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying the principles of this invention.

Figure 2 is a sectional view showing the power transmission to the vertical spindle of the machine.

Figure 3 is a plan view of the machine shown in Figure 1.

Figure 4 is a sectional view showing the power transmission to the horizontal cutter spindles.

Figure 5 is a detail view in elevation of the trip mechanism associated with the movable cutter spindle carrier.

Figure 6 is a plan view of a portion of the mechanism shown in Figure 5, as viewed on the line 6—6 of that figure.

Figure 7 is a plan view of the trip mechanism mounted on the rear side of the work table.

Figure 8 is a detail section on the line 8—8 of Figure 1.

Figure 9 is a detail view as taken on the line 9—9 of Figure 8.

Figure 10 is a detail view taken on the line 10—10 of Figure 1.

Figure 11 is a view in elevation as taken on the line 11—11 of Figure 10.

Figure 12 is a diagrammatic view of the transmission and control mechanism for the machine.

In milling large castings there is usually a number of plain surfaces to be finished or machined, but due to the size of the casting the surfaces are widely separated and lie in different planes which prevents the possibility of milling more than one surface in a single setup with the ordinary and conventional types of milling machines.

The machine of this invention has been so contrived that a number of surfaces not susceptible of being machined in a single operation on conventional machines may be machined in a single setup of the work piece. Such a machine is illustrated in Figures 1 and 3 of the drawings and comprises a large rectangular base portion 10 upon which is formed suitable guideways 11 for receiving and supporting a work receiving table 12. Mounted on another portion of the bed 10 is an upstanding structure 13 in which is journaled a pair of cutter spindles 14 and 15. The structure 13 has a guideway 16 formed on the top thereof in which is slidably mounted a spindle carrier 17 having a cutter spindle 18 rotatably journaled in the end thereof.

Power operable means are provided for reciprocating the table 12 transversely of the cutter spindles 14 and 15 whereby a cutting path may be generated parallel to the direction of movement of the table; and additional power operable means have been provided for moving the spindle carrier 17 along a path angularly related to the path of movement of the table whereby a cutting path may be generated when the table is held stationary which has a direction which is angularly related to the direction of table movement.

Separate power operable means have been provided for rotating the vertical spindle and the horizontal spindles and these means are illustrated in Figures 2 and 4 respectively of the drawings. The power transmission for rotating the vertical spindle is shown in Figure 2 and is self-contained and movable with the carrier 17. This transmission includes a prime mover, such as the electric motor 19, which is connected through a chain drive 20 for rotation of shaft 21. This shaft has a bevel pinion 22 which intermeshes with a large bevel gear 23 which is journaled in anti-friction bearings 24 and which has a splined connection with the spindle 18. The spindle 18 is anti-frictionally journaled in a quill 25 which is vertically adjusted in the carrier 17 whereby the plane of rotation of the cutter 26 attached to the spindle may be variably determined.

The quill adjusting mechanism may be of a conventional type comprising a manually rotatable shaft 27 which is connected through bevel gearing 28 to a worm wheel 29, intermeshing with suitably formed teeth 30 cut in the periphery of the quill 25. There has thus been provided a carrier which is movable in an angular relation with respect to the table and which has self-contained therein a power transmission for rotating a vertical spindle which is axially adjustable in accordance with the height of the surface to be finished.

The horizontal cutter spindles 14 and 15, shown in Figure 4, are driven from a second prime mover, such as the motor 31 which is mounted upon the top of the structure 13 connected by a chain and sprocket drive 32 for rotation of a common drive shaft 33. This shaft carries a pinion 34 which rotates spur gear 35 for rotation of cutter spindle 15; and drives spur gear 36 for rotation of spindle 14, the spur gear 36 intermeshing with gear 37 which has a spline connection with spindle 14.

The cutter spindle 14 is anti-frictionally journaled at one end in an adjustable quill 38 whereby a cutter 39 attached to the end of the spindle may be variably located in accordance with the position of the surface to be finished. A mechanism indicated generally by the reference numeral 40 may be utilized for adjusting the quill and this mechanism may be the same as that described in connection with the quill adjusting mechanism shown in Figure 2.

The cutter spindle 15 is eccentrically journaled in a quill 41 and has an internal gear 42 keyed to the upper end thereof. The internal gear 42 meshes with a spur gear 43 which is fixed with shaft 44 which carries the spur gear 35. By means of this arrangement the cutter spindle 15 may be rotated in its eccentric position and the quill 41 may be rotatably adjusted without breaking the driving connection to the spindle.

In addition the internal gear 42 has elongated teeth whereby the quill 41 may be axially adjusted to vary the cutting plane of the cutter 45 attached to the end of spindle 15. A quill adjusting mechanism, indicated generally by the reference numeral 46, is provided for effecting axial adjustment of the quill. The support 13 is divided, as shown at 47 in Figure 1, for clamping purposes and a pair of clamping bolts 48 are provided for securely clamping the quill in any adjusted position. It will be noted from Figure 1 that the end of the quill 41 has a plurality of radial holes 49 drilled in the periphery thereof whereby a suitably formed wrench may be utilized for changing the eccentric position of the cutter spindle. By means of this arrangement the cutter 45 may be raised or lowered in a vertical plane and axially adjusted in a horizontal plane in accordance with the position of the surface on the work which is to be finished.

Fluid operable means are provided for reciprocating the table 12 and the carrier 17. As shown in Figure 12, a cylinder 50 having a contained piston 51 is provided for moving the table 12, the piston being connected by a piston rod 52 to the end of the table.

A cylinder 53 having a contained piston 54 is provided for moving the carrier, the piston being connected by the piston rod 55 to one end of the carrier.

Fluid is supplied to these cylinders from a common set of pumps including a variable delivery feed pump 56, a pump 57 and a rapid traverse pump 58. A first control valve 59 is provided for determining the coupling of the pumps to the cylinder 53, and a second control valve 60 is provided for controlling the flow to cylinder 50. These valves are exactly the same in construction and each one has three positions, including a feed position, a central or stop position and a rapid traverse position. The plunger 61 of valve 60 is shown in a stop position and the plunger 62 of valve 59 is shown in a feed forward position. Thus, no fluid will be delivered to the cylinder 50, but will be delivered to the cylinder 53.

In the latter case, the port 63 of valve 59, which is connected by channel 64 to the feed port 65 of cylinder 53, is connected by a cannelure 66 in plunger 62 to port 67. The variable delivery feed pump 56 has a delivery line 68 connected to port 67 and a return line 69 which is connected to port 70. The port 70 is connected by a cannelure 71 to port 72 of valve 59 and this port is connected by channel 73 to the other end of cylinder 53. Thus, the fluid from the variable delivery pump 56 is delivered to one end of cylinder 53 and the fluid escaping from the other end of the cylinder is returned to the intake of the variable delivery pump. In order to care for any leakage of oil from the system and to insure a constant pressure, a low volume high pressure booster pump 57 is supercharged by the rapid traverse pump 58 through channel 74 and the delivery port of the pump is connected by channel 75 to channel 68 which is the delivery line of the variable feed pump.

It will be noted that the port 67 is in the form of an annular groove in valve 59 and this annular groove is connected by channel 76 to port 77 of valve 60. The port 77 thus corresponds to port 67 of valve 59 in that both are supplied from the variable delivery feed pump 56 so that by connecting either of these ports to the respective cylinders, the respective slides will be moved at a feed rate. Similarly, the port 78 is connected by a channel 78 to port 79 of valve 60 so that the return side of cylinder 50 may be connected to the intake side of the variable delivery pump when the output of the pump is connected to the opposite end of the cylinder.

As previously mentioned, the valve plunger 61 is in a stop position and therefore the pressure port 77 is disconnected by the spool 80 from port 81 and channel 82 leading to one end of cylinder 50. Likewise the port 79 is disconnected by the valve spool 83 from port 84 and channel 85 leading to the opposite end of cylinder 50.

The rapid traverse pump 58 is utilized for returning either of the slides to a starting position at a fast rate and has a delivery channel 86 which is connected to port 87 of valve 60. When the pump is not being utilized for effecting movement of the slide, it is desirable that the same be connected to reservoir so as to eliminate high pressures building up in the various channels. Therefore, at this time, the port 87 is connected by cannelure 88 to port 89 and channel 90. This channel is connected by port 91, cannelure 92 and port 93 to the return line 94 which leads to the reservoir 95. The port 87 thus becomes the rapid traverse supply port for valve 60 and the port 91 the rapid traverse supply port for valve 59. In other words, when the plunger 62 is shifted to the extreme right position it moves a sufficient distance to interconnect port 91 with port 72, whereby fluid from pump 58 will be delivered to the end of cylinder 53 opposite to the feed port 65 to thereby cause a rapid return movement of the slide 17. At this time the channel 64 is connected by the cannelure 66 to the return port 96 which is connected by branch 97 to the return line 94. When the plunger 62 is in the same position as the plunger 61 is now shown the slide 17 will be stopped.

The valve plunger 61 which controls movement of slide 12 has the same three positions as plunger 62 and when shifted to the left will connect the feed port 77 to port 81 to cause feed movement of slide 12 toward the left; and in its other extreme position will connect the rapid traverse port 87 to port 84 to cause a rapid return movement of slide 12. The valve plunger 62 is shifted by a lever arm 98 connected to rotatable shaft 99. The shaft 99 extends through the bed of the machine, as shown in Figure 1, where it is provided with a manually operable handle 100.

The shaft 99 is also adapted to be trip actuated from a feed position to a rapid traverse position. The shaft 99 extends through to the opposite end of the bed where it is provided with crank arm 101 which is connected by a link 102 to the oscillatable member 103. This member has a pivotal connection at 104 to a link 105 which is operatively connected through a bell crank 106 to link 107. The link 107 is connected to the crank arm 108 of a trip plunger 109. A trip lever 110 is attached to the trip plunger and has a pair of contact portions 111 and 112 at opposite extremities thereof which, as shown in Figure 6, lie in different planes. The contact portion 111 is adapted to be engaged by trip dog 113 and the portion 112 is adapted to be engaged by the trip dog 114. A detent plate 115 is keyed to the plunger 109 and a spring pressed detent 116 is associated therewith for normally holding the trip plunger in either one of two rotatable positions.

In other words, as the slide 17 advances on its feeding stroke, which would be to the left as viewed in Figure 5, the trip dog 113 will engage the contact portion 111 and rotate plunger 109 in a counterclockwise direction, as viewed in Figure 5. This will also cause rotation of the detent plate 108. It will be noted, however, that the notches 117 and 118 in the detent plate are cut to different depths so that the peak 119 is not located midway of the throw of the lever, but to one side of the center whereby after approximately one-third of the throw has been completed the detent member 116 will ride over the peak and automatically complete the remainder of the throw. A similar detent lever 120 is associated with the shaft 99 and has a cooperating spring pressed detent 121. The end of this detent lever is formed the same as lever 108 and therefore will assist in completing the automatic shifting of plunger 62. By having a detent lever at each end of the linkage it is possible to obtain accurate positioning of the valve plunger 62, as well as accurate positioning of the trip plunger.

When the valve plunger 62 is shifted to its extreme right position by the trip mechanism, the rate, as well as the direction of movement, of the slide 17 is changed because, first, the rapid traverse pump is connected to the cylinder 53 and furthermore this pump is connected to the opposite end of the cylinder to which the feed pump was connected.

As the slide 17 returns to its starting position at a rapid traverse rate the dog 114 will engage the contact portion 112 of lever 110 and rotate the same in a clockwise direction, as viewed in Figure 5. This movement will continue until the valve 62 has moved sufficiently toward the left to disconnect the rapid traverse port 91 from port 72, but further movement of the valve plunger will not take place due to the fact that the detent members 116 and 121 are in the deeper detents and the trip operated movement is not sufficient to move them over the peak points on the detent levers. The result is that the slide is stopped. This condition of the parts does not prevent the operator from actuating the control lever 100 in a direction to complete this movement, which would result in the slide moving ahead again on a feed stroke.

The valve plunger 61 is operated by a simple trip mechanism comprising a trip plunger 122 to which is attached another trip lever 110 which is operable by dogs 123 and 124 carried by the slide 12. Also attached to the trip plunger 122 is a lever 125 which is connected by a link 126 to a lever 127 which is keyed to shaft 128. This shaft carries another detent plate 120 having a spring pressed detent 121. A manually operable lever 129 mounted on the front of the machine is keyed to the end of the shaft 128 for manual operation of the valve plunger 61 through the lever 130 keyed to shaft 128. In the position of the parts shown the trip dog 123 prevents movement of the trip lever 130 in a clockwise direction, but will permit movement of the lever in a counterclockwise direction to institute a feeding movement of slide 12.

An interlocking mechanism has been provided for preventing movement of either hand lever 100 or hand lever 129 to a feed position when the other has already been moved to such a position and comprises an interlock lever 131 formed integral with the pivoted member 103 which is adapted to cooperate with an interlock plate 132 carried by the slide 12. The plate 132 has a notch 133 formed in it which is adapted to receive a roller 134 carried in the end of lever 131 when the slide 12 is in a returned stop position. If the slide 12 is actuated, the roller 134 is moved out of the slot by the moving plate 132, which rotates the shaft 99 and detent 120 in a clockwise direction to a mid-position if not already in such position, further movement in that direction is prevented by the lever 110 contacting the trip dog 113. It will thus be seen that during the movement of the slide 12 the valve plunger 62 is located in an intermediate position.

Similarly, when the slide 17 is moving, a detent plate 135 attached to the slide 17 engages the end of an interlock lever 136 which is keyed to a rotatable shaft 137, this shaft having an arm 138 connected by intermediate linkage to shaft 122. This linkage comprises a link 139 which is connected through a bell crank 140 to a link 141 which, in turn, is pivotally connected to lever 125 of trip plunger 122. When the slide 17 is in its return position the end of the interlock lever 136 may move in a clockwise direction beyond the end of plate 135. But when the slide 17 is executing a cycle, movement of lever 130 connected to plunger 131 is prevented in one direction by interlock lever 136 engaging interlock plate 135, and in the opposite direction by trip arm 110 engaging trip dog 123.

A separate stop lever 142 has been provided on the front of the machine, as shown in Figure 1, and this lever is so connected that regardless of which slide is being moved, operation of this lever will stop said movement. This lever is connected to a shaft 143, which, as shown in Figure 8, has a crank arm 144 connected by a link 145 to a crank arm 146 keyed to shaft 147. The shaft 147 actually extends in a vertical direction in the machine, as shown in Figure 9, and has a pair of spools 148 keyed thereto, each spool having a flat side 149. These spools are positioned opposite the detent levers 120 whereby when they are in the position shown in Figures 10 and 11 the levers may be rotated but when the spool is rotated to the position shown in Figures 8 and 9, the detent levers will be moved to a central position and held in such position against movement until the stop lever is returned to a running position.

If it is desired that the slide 17 move at variable rates, a rate control cam 150 may be attached to the side of the slide for cooperation with a crank 151 which is connected by link 152, bell crank 153 and link 154 to lever 155 pivotally mounted on the fixed shaft 156. The lever 155 may have integrally connected therewith a suitably shaped cam member 157 which can engage the roller 158 in the end of the pump control pendulum 159 whereby rotation of the cam 157 in a clockwise direction will increase the displacement of the pump. A spring 160 may be attached to the cam 157 to rotate the same in a counterclockwise direction and permit the pump pendulum to return to a zero displacement position.

There has thus been provided an improved machine for the purposes disclosed which is simple to construct and operate and which makes it possible to machine a number of surfaces on a single set-up of a work piece, which would normally be inaccessible on the conventional type of machines and therefore require a second set-up in order to machine them.

I claim:—

1. In a machine tool having a work support and a tool support, the combination of power operable means for effecting a cycle of movement between the supports including feed forward, reverse, and rapid return; a shiftable control member having a central position which stops the support, and positions on either side thereof to effect feed advance and rapid return, a detent mechanism associated with said control member, a trip plunger operable by the slide, a detent plate having notches of different depth, and a cooperating spring pressed detent whereby a predetermined movement of the trip plunger in one direction will effect shifting of said control member from one extreme position to the other, but movement of the trip plunger the same predetermined amount of movement in the opposite direction will only shift said control member from an extreme position to a central position.

2. In a machine tool having a pair of slides selectively movable to generate different cutting paths, the combination of power operable means for moving the respective slides including individual controls, each movable to a starting position to initiate a cycle of movement of the respective slides, and means carried by the slides whereby the moving slide will automatically prevent movement of the control lever for the other slide to a starting position, including a plate carried by the slide and a pivoted member operatively connected to the control lever, said member being positioned to engage said plate when the lever is in a stop position.

3. In a machine tool having a pair of movable slides and fluid operable motors for moving the respective slides, the combination of means for controlling operation of said motors, including individual control valves therefor, a feed pump connected in parallel to said valves, a rapid traverse pump connected in series to said valves, means in each valve to connect the feed pump for operation of the respective motor in one direction and to connect the rapid traverse pump for operation of the motor in an opposite direction, and interlock means to prevent utilization of more than one of said valves at a time.

4. In a milling machine having a bed, a cutting means carried by the bed, a work slide and a cutter slide carried by the bed, the combination of transmission means for effecting sequential movement of the slides to produce different cutting paths including fluid operable pistons, individual control valves therefor having stop positions, means to move either of said valves from its stop position to an operating position, and positive acting means effective on said movement for holding the other valve in a stop position, said positive acting means including a dog carried by the slide, a plate carried by the moving slide and linkage interposed therebetween and connected to the valve.

5. In a milling machine having a bed, a cutter spindle journaled on the bed, a work slide, and a cutter slide having a cutter spindle journaled therein, the combination of transmission means for producing different cutting paths including branch transmissions to each slide, control members for each branch transmission having a central or stop position, a feed position on one side and a rapid traverse position on the other side of said central position, means carried by the slides when in a starting position to prevent movement of either of said controls to a rapid traverse position, either of said controls being movable at will however to a feed position to cause movement of its respective slide, and means positionable by the moved slide as it leaves its starting position to lock the control member of the other slide in its stop position.

6. In a milling machine having a bed, a cutter spindle journaled in the bed, a work slide, and a cutter supporting slide, the combination of transmission means for moving each of said slides for producing different cutting paths including branch transmissions to each slide, individual rate and direction control members therefor having a stop position, a feed forward position and a rapid return position, a trip plunger associated with each slide, linkages operatively connecting the trip plungers to the respective control members, manual control levers for the control members and remotely located with respect to said trip plungers, dogs carried by each of said slides and effective upon return movement thereof to shift said control members to a stop position, each linkage including an interlock lever, interlock plates carried by the slides and cooperating with the interlock lever of the other slide whereby upon movement of one slide the control linkage of the other slide is locked; and relieved portions in each plate and effective when the slides are in a starting position to permit operation of either linkage at will.

7. In a machine tool having a cutter support and a work support, one of which is movable relative to the other, the combination with transmission means for effecting said movement, of a transmission control member, a trip control plunger associated with the movable slide and remotely located with respect to said control member, a linkage mechanism interconnecting said trip plunger for transmission of movement to said control lever, and a detent mechanism connected to each end of said linkage for insuring accurate positioning of both said trip plunger and said control member.

HERMAN HORLACHER.